US006543971B2

(12) United States Patent
Mawhinney

(10) Patent No.: US 6,543,971 B2
(45) Date of Patent: Apr. 8, 2003

(54) DEPTH SENSITIVE CLUTCH MECHANISM FOR DRILL

(76) Inventor: Matthew W. Mawhinney, 196 W. Meyer Ave., New Castle, PA (US) 16105

( * ) Notice: Subject to any disclaimer, the term of this patent is extended or adjusted under 35 U.S.C. 154(b) by 0 days.

(21) Appl. No.: 09/800,618

(22) Filed: Mar. 7, 2001

(65) Prior Publication Data

US 2002/0127070 A1 Sep. 12, 2002

(51) Int. Cl.⁷ .......................... B23B 39/00; B23B 39/14
(52) U.S. Cl. .......................... 408/202; 408/15; 408/139
(58) Field of Search .......................... 408/14, 15, 139, 408/114, 202, 204

(56) References Cited

U.S. PATENT DOCUMENTS

| | | | | | |
|---|---|---|---|---|---|
| 2,608,114 A | * | 8/1952 | Martin et al. | ............... | 279/155 |
| 2,823,563 A | * | 2/1958 | Nipken | ............... | 408/110 |
| 3,060,772 A | * | 10/1962 | Crump | ............... | 408/112 |
| 3,320,832 A | * | 5/1967 | Jensen | ............... | 408/112 |
| 4,029,429 A | * | 6/1977 | Johnson | ............... | 192/21 |
| 4,090,806 A | * | 5/1978 | Kato | ............... | 408/139 |
| 4,115,017 A | * | 9/1978 | Wilhelmsson | ............... | 408/14 |
| 4,274,768 A | * | 6/1981 | Kato | ............... | 408/139 |
| 4,789,274 A | * | 12/1988 | Shoji et al. | ............... | 408/11 |
| 4,813,822 A | * | 3/1989 | Biek | ............... | 408/137 |
| 4,832,542 A | * | 5/1989 | Johnson et al. | ............... | 192/21 |
| 5,380,132 A | * | 1/1995 | Parks | ............... | 408/113 |
| 5,538,371 A | * | 7/1996 | Kubo | ............... | 192/21 |
| 5,890,897 A | * | 4/1999 | Kruger et al. | ............... | 408/202 |
| 6,203,253 B1 | * | 3/2001 | Perrault | ............... | 408/202 |

FOREIGN PATENT DOCUMENTS

EP 395335 * 10/1990

* cited by examiner

Primary Examiner—Mark S. Graham
(74) Attorney, Agent, or Firm—Richard K. Thomson

(57) ABSTRACT

Driving engagement is obtained between an arbor held in a machine tool and a collet holder that supports a drill bit by locking balls that are secured in engagement with drive surfaces by a locking ring. A nose cone is adjustably attached to the front of the locking ring and when the nose cone bottoms out on the workpiece, continued movement of the drill bit assembly relative to the nose cone assembly causes the locking ring to allow the locking balls to disengage the collet holder after ½" additional travel. Inner and outer springs reposition the clutch mechanism in its initial position for subsequent drilling operations.

15 Claims, 1 Drawing Sheet

DEPTH SENSITIVE CLUTCH MECHANISM FOR DRILL

BACKGROUND AND SUMMARY OF THE INVENTION

The present invention is directed to a clutch mechanism that disengages the rotational drive to the drill bit assembly when a hole of the desired depth has been drilled.

It is frequently desirable when drilling holes, in castings for example, to drill a hole to a particular precise depth. Such applications are typical when drilling holes in cast engine blocks, or the like, that may have a fluid cavity that must not be penetrated or where a clamp is to be positioned at a certain depth from the surface. These castings have irregular surface features that make it difficult for the drill operator to know when the desired depth has been reached. Currently, in drilling these orifices, the CNC (computer numerically controlled) machine operator must stop the machine, make a calculation based on the configuration of the surface and manually adjust the depth, altering the computer program for each orifice drilled. Alternatively, a sensor may be used to determine the surface characteristics of the casting and alter the computer program to provide the desired drilled depth.

The present invention provides a clutch mechanism for limiting the depth of penetration by a drill, the clutch mechanism comprising an arbor having a first end insertable within a spindle of a machine tool and a second hollow end; a collet holder having a first end partially received within the hollow end of the arbor, a central portion having drive surfaces thereon, and a second end receiving and securing a drill bit therein, the arbor, the collet holder and the drill bit forming an inner assembly; clutchable drive means positioned between the arbor and the collet holder, means for mounting said locking ring on the second hollow end of the collet holder, the means for mounting permitting relative longitudinal movement therebetween; sensing means for determining when the drill bit has reached a desired maximum penetration depth; whereby, when the sensor means determines that the maximum depth of penetration has been reached by the drill bit, the clutchable drive between the arbor and the collet holder is disengaged to prevent further drilling.

In the preferred embodiment, the sensing means comprises a nose cone assembly including a nose cone surrounding a portion of the second end of the collet holder and at least a portion of the drill bit; means attaching the nose cone assembly to a ball locking ring such that the nose cone assembly and ball locking ring move longitudinally as an outer unit, the ball locking ring having a first inner diameter engaging a plurality of locking balls and holding them in a first position in contact with the drive surfaces of said collet holder and a second larger inner diameter maintaining the locking balls in said apertures but permitting the locking balls to move to a second position disengaged from the drive surfaces of the collet holder; whereby, when the distal end of the nose cone contacts a workpiece being drilled, forward movement of the outer unit is halted and relative longitudinal movement of the inner assembly over a short distance permits the locking balls to move from the first diameter of the ball locking ring to the second diameter disengaging rotational drive of the collet holder and drill bit, thereby limiting the depth of penetration of the drill bit.

The means for mounting the nose cone to the ball locking ring includes a coarse thread on two engaged members enabling the position of the nose cone relative to the drill bit to be readily adjusted to alter the depth at which the drive clutch is disengaged. A first spring biases the outer assembly to its forward most position when the nose cone is disengaged with the surface of the workpiece. A second spring also biases the collet holder and attached drill bit to their extended position such that the ball locking ring re-positions the locking balls in the drive races once again when the forward push on the assembly is relieved. A first slide bushing positioned within the hollow end of the arbor facilitates relative longitudinal movement between it and the collet holder. A second slide bushing mounted in a recess in an upper end of the locking ring facilitates relative longitudinal movement between it and the arbor so that the ball locking ring may collapse upon the arbor once the locking balls have moved to their second disengaged position.

A cap nut threadingly engages a lower portion of the adjusting ring, the cap nut capturing the nose cone assembly and securing it to a remaining portion of the outer unit. A bearing positioned between the clutch assembly and the remaining portion of the outer unit permits the balance of the outer unit to continue to freely rotate once a downward force on the nose cone against the workpiece brings the nose cone assembly to rest. A stop nut threadingly engaging the coarse thread on the exterior of the ball locking ring positioned against an upper surface of the adjusting ring prevents undesired movement thereof.

The nose cone assembly includes a connector ring having a first internal thread which engages a threaded portion of said nose cone, and a second internal thread which engages an external thread on an inner cap ring, the inner cap ring having an outwardly extending flange which is surrounded by an inwardly protruding flange on a lower portion of the adjusting ring.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawing in which.

DETAILED DESCRIPTION OF PREFERRED EMBODIMENT(S)

Figure 1:
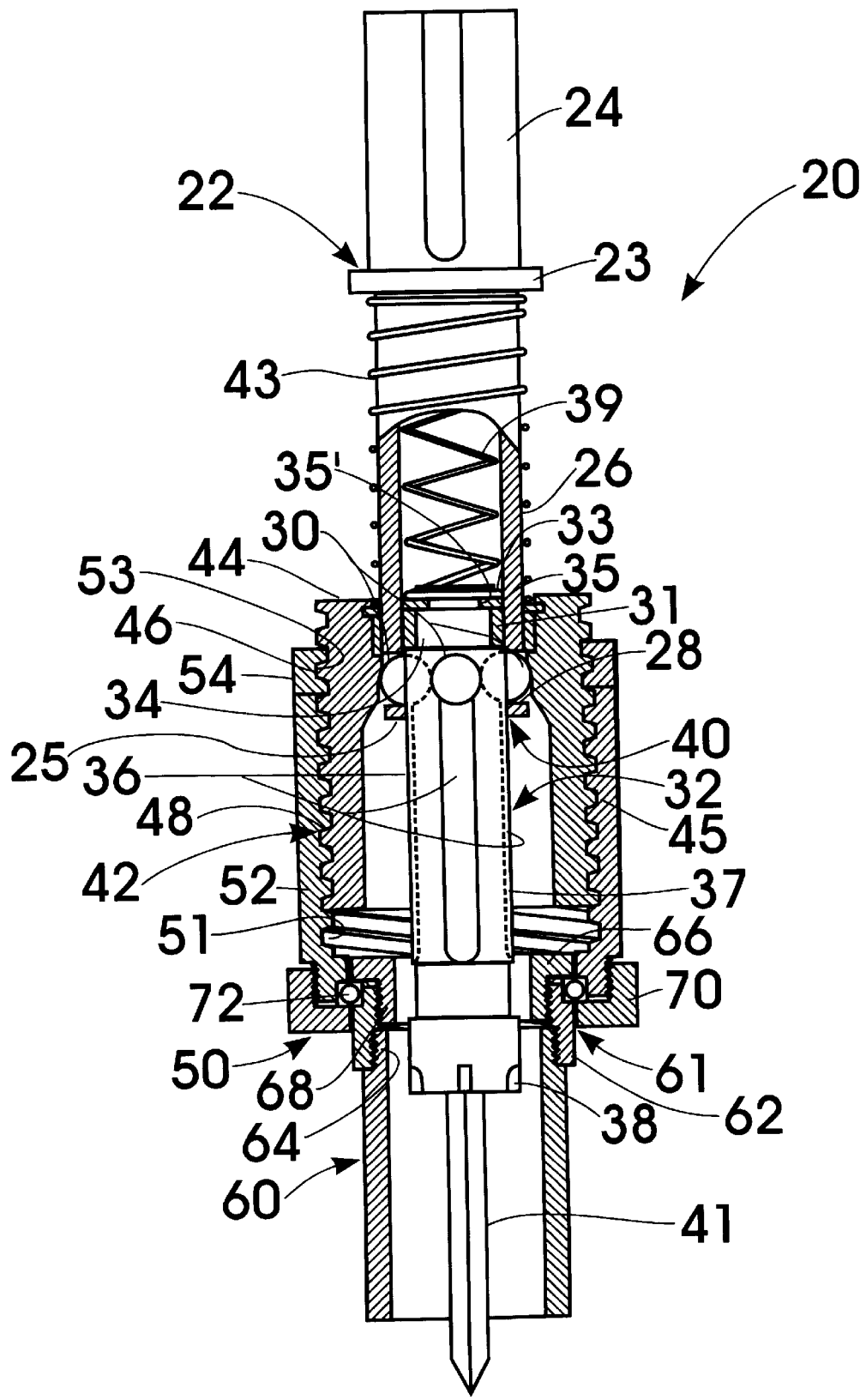
FIG. 1 is a cross-sectional side view of a first embodiment of the depth sensitive clutch mechanism of the present invention.

A first embodiment of the depth sensitive clutch mechanism of the present invention is shown in FIG. 1 generally at 20. Clutch mechanism 20 comprises arbor 22, collet holder 32, ball locking ring 42, and nose cone 60. Arbor 22 has a first end 24 that is insertable in the spindle of a machine tool such as a CNC drill (not shown) and a second hollow end 26. Hollow end 26 has a plurality of apertures 28 (shown here as four in number) formed therein proximate the terminal end 25. A second like plurality of locking balls 30 protrude through apertures 28 for purposes that will be discussed, infra. First end 24 has formed thereon a flange 23 that limits the distance arbor 22 can be inserted into the machine tool and provides a reaction surface for outer spring 43.

Collet holder 32 has a first end 34 that extends partially into the hollow end 26 of arbor 22 and prevents the locking balls 30 from collapsing there into. A third like plurality of drive surfaces in the form of slots 36 are positioned about the periphery of collet holder 32 extending axially there along on central portion 37 of collet holder 32. Second end 38 of collet holder 32 receives and secures a drill bit 41 for rotation as part of inner (drill bit) assembly 40 which is comprised of arbor 22, collet holder 32 and drill bit 41. First end 34 of collet holder 32 mounts a slide bearing 31 held in place by a circlip 35 seated in slot 35'. Slide bearing 31 facilitates axial movement of collet holder 32 in hollow end 26 of arbor 22 as locking balls 30 move axially along drive surfaces 36. Inner spring 39 reacts against the top 33 of first end 34 of collet holder 32 and the internal upper limit (not shown) of hollow end 26 biasing collet holder 32 to its fully extended position.

Ball locking ring 42 partially surrounds collet holder 32 and keeps locking balls 30 from falling out of apertures 28. Ball locking ring 42 has a first section 46 with a first inner diameter that engages locking balls 30 and holds them in a first position in driving engagement with drive surfaces 36. A second section 48 has a second larger inner diameter that maintains the locking balls in apertures 28 but allows locking balls 30 to move to a second position in which they move along drive surfaces 36. Outer spring 43 reacts between flange 23 and top 44 of ball locking ring 42 to bias outer (nose cone) assembly 50 (including ball locking ring 42 and nose cone 60) to its fully extended position.

The external periphery of ball locking ring 42 has a coarse thread 45 thereon that mates with an internal thread 51 on adjusting ring 52 and a second internal thread 53 on lock nut 54. By altering the position of adjusting ring 52 and nose cone 60 that is attached thereto, the point at which the locking balls 30 disengage from drive surfaces 36 and, hence, the depth of the drilled hole can be adjusted. Once adjusting ring 52 is properly positioned, locking nut 54 is run down thread 45 against the upper surface of adjusting ring 52 to prevent its undesired movement. Nose cone 60 has inner ring 62 threaded to an upper external portion 64 thereof. Inner ring 62 is also threaded to an external barrel portion 68 of cap ring 66. Nose cone 60, inner ring 62, and cap ring 66 form a nose cone subassembly 61. Cap nut 70 threads onto the end of adjusting ring 42 capturing bearing 72 and nose cone subassembly 61. Bearing 72 allows the balance of clutch mechanism 20 (drill bit assembly 40 and nose cone assembly 50 less subassembly 61) to continue to rotate after the nose cone 60 contacts the workpiece stopping its rotational movement.

In using the drill clutch mechanism 20 of the preferred embodiment, adjusting ring 52 is set for the desired depth. Indicia (not shown) may be marked on the outer periphery of ball locking ring 42 showing the depth for the placement of adjustment ring 52 given a particular length of drill bit 41. Lock nut 54 is secured behind adjusting ring 52 to prevent undesired relocation. The depth sensitive clutch mechanism 20 is positioned in the machine tool by inserting the end 24 of arbor 22 into the chuck, or the like, until the flange 23 abuts the protruding end thereof. Drilling of the workpiece commences. Once the nose cone 60 contacts the workpiece, drill bit 41 may continue to rotate and penetrate the workpiece until the drill bit assembly 40 experiences ½" relative movement with respect to the nose cone assembly 50. At this point, locking balls 30 disengage from drive surfaces 26 and further drilling is stopped. However, the machine tool spindle may continue to move toward the workpiece for up to 1½". Inner spring 39 permits the collet holder 32 to collapse into the arbor 22 during this continued forward press. When this movement is abated, inner spring 39 and outer spring 43 restore the tool to its initial position for the next drilling operation.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A clutch mechanism for limiting the depth of penetration by a drill, said clutch mechanism comprising
   a) an arbor having a first end insertable within a spindle of a machine tool and a second hollow end, a first plurality of apertures formed in said second hollow end adjacent a terminal end thereof, a second like plurality of locking balls received in and protruding partially out of said first plurality of apertures;
   b) a collet holder having a first end partially received within said hollow end of said arbor engaging said locking balls and restraining them against collapsing inwardly within said apertures, a central portion having drive surfaces thereon, and a second end receiving and securing a drill bit therein, said arbor, said collet holder and the drill bit forming an inner assembly;
   c) a ball locking ring surrounding a portion of said second hollow end and said first end of said collet holder, said ball locking ring having a first section with a first inner diameter engaging said locking balls and holding them in a first position in contact with said drive surfaces of said collet holder and a second section with a second larger inner diameter maintaining said locking balls in said apertures but permitting said locking balls to move to a second position disengaged from said drive surfaces of said collet holder;
   d) means for mounting said ball locking ring on said second hollow end of said collet holder, said means for mounting permitting relative longitudinal movement therebetween;
   e) a nose cone assembly including a nose cone surrounding a portion of said second end of said collet holder and at least a portion of the drill bit;
   f) means attaching said nose cone assembly to said ball locking ring such that the nose cone assembly and ball locking ring move longitudinally as an outer unit;
whereby, when said distal end of said nose cone contacts a workpiece being drilled, forward movement of said outer unit is halted and relative longitudinal movement of said inner assembly over a short distance permits said locking balls to move from said first diameter of said ball locking ring to said second diameter disengaging rotational drive of said collet holder and drill bit thereby limiting the depth of penetration of the drill bit.

2. The clutch mechanism of claim 1 wherein said means for mounting said nose cone assembly to said ball locking ring comprises means to permit adjustment of a position of said distal end of said nose cone relative to a distal end of the drill bit.

3. The clutch mechanism of claim 2 wherein said means attaching said nose cone assembly to said ball locking ring to permit adjustment comprises a coarse external thread on an exterior portion of said ball locking ring, an adjustment ring threadingly engaging said ball locking ring and attached to said nose cone, rotation of said adjusting ring relative to said ball locking ring changing the effective length of said outer unit and, hence, the depth of hole drilled by said drill bit.

4. The clutch mechanism of claim 2 wherein said means for attaching said nose cone assembly to said ball locking ring further comprises means to lock said nose cone assembly in position relative to said ball locking ring.

5. The clutch mechanism of claim 3 further comprising a first spring surrounding a middle portion of said arbor and biasing said outer unit to a extended position following completion of a drilling operation.

6. The clutch mechanism of claim 5 wherein said locking balls in said first position engage a rear portion of slots formed in said collet holder and prevent said first end of said collet holder from being removed from said second hollow end of said arbor.

7. The clutch mechanism of claim 6 further comprising a second spring positioned within said second hollow end of said arbor engaging a top portion of said collet holder returning said collet holder and drill bit to their extended position following completion of a drilling operation.

8. The clutch mechanism of claim 7 further comprising a slide bushing positioned within said hollow end of said arbor and surrounding an upper portion of said collet holder, said slide bushing facilitating movement of said collet holder relative to said arbor once said locking balls move to said second position.

9. The clutch mechanism of claim 8 wherein said means attaching said nose cone to said ball locking ring to permit adjustment further comprises a cap nut threadingly engaging a lower portion of said adjusting ring, said cap nut capturing said nose cone assembly and securing it to a remaining portion of said outer unit.

10. The clutch mechanism of claim 9 further comprises a bearing positioned between said clutch assembly and said remaining portion of said outer unit to permit a balance of said outer unit to continue to freely rotate once a downward force on said nose cone against the workpiece brings said nose cone assembly to rest.

11. The clutch mechanism of claim 9 further comprising a stop nut threadingly engaging said coarse thread on said exterior of said ball locking ring positioned against an upper surface of said adjusting ring to prevent undesired movement thereof.

12. The clutch mechanism of claim 8 wherein said nose cone assembly further comprises a connector ring having a first internal thread which engages a threaded portion of said nose cone, and a second internal thread which engages an external thread on an inner cap ring said inner cap ring having an outwardly extending flange which is surrounded by an inwardly protruding flange on a lower portion of said adjusting ring.

13. The clutch mechanism of claim 1 further comprising a slide bushing positioned in an upper end of said ball locking ring permitting said ball locking ring to be collapsed upon said arbor once said locking balls move to said second position.

14. A clutch mechanism for limiting the depth of penetration by a drill into a workpiece, said clutch mechanism comprising a) an arbor having a first end insertable within a spindle of a machine tool and a second hollow end;

b) a collet holder having a first end partially received within said hollow end of said arbor, a central portion having drive surfaces thereon, and a second end receiving and securing a drill bit therein, said arbor, said collet holder and the drill bit forming an inner assembly;

c) clutchable drive means positioned between said arbor and said collet holder;

d) means for mounting said clutchable drive means on said second hollow end of said collet holder, said means for mounting permitting relative longitudinal movement therebetween;

e) a nose cone assembly contacting an upper surface of the workpiece and determining when said drill bit has reached a desired maximum penetration depth;

whereby, when said nose cone assembly determines that the maximum depth of penetration has been reached by the drill bit, said clutchable drive means is disengaged to prevent further drilling.

15. The clutch mechanism of claim 14 wherein said nose cone assembly comprises a nose cone surrounding a portion of said second end of said collet holder and at least a portion of said drill bit; means attaching said nose cone assembly to a ball locking ring such that the nose cone assembly and ball locking ring move longitudinally as an outer unit, said ball locking ring having a first inner diameter engaging a plurality of locking balls and holding them in a first position in contact with said drive surfaces of said collet holder and a second larger inner diameter maintaining said locking balls in said aperture but permitting said locking balls to move to a second position disengaged from said drive surfaces of said collet holder; whereby, when said distal end of said nose cone contacts a workpiece being drilled, forward movement of said outer unit is halted and relative longitudinal movement said inner assembly over a short distance permits said locking balls to move from said first diameter of said ball locking ring to said second diameter disengaging rotational drive of said collet holder and drill bit thereby limiting the depth of penetration of the drill bit.

* * * * *